United States Patent Office 3,793,255
Patented Feb. 19, 1974

3,793,255
PROCESS FOR THE CONTINUOUS PERFORMANCE OF AN ANIONIC POLYMERIZATION OF LACTAMS
Arthur Handtmann, 25 Vorarlbergerstrasse, 795 Biberach an der Riss, Germany
Filed Feb. 14, 1972, Ser. No. 225,997
Claims priority, application Germany, Feb. 24, 1971, P 21 08 759.2
Int. Cl. C08g 20/18
U.S. Cl. 260—78 L
4 Claims

ABSTRACT OF THE DISCLOSURE

A process for the continuous performance of an anionic polymerization of lactams is disclosed. In the process catalysts such as lactam alkali or alkaline earth metal compounds and activators such as acylated lactams or acylatable compounds are mixed with molten lactam in the presence of nitrogen. The process is characterized by the fact that simultaneously one portion of molten lactam is mixed with an activator and a second portion is mixed with a catalyst, in each case with exclusion of oxygen and continuous nitrogen action on the two melts, before eventually being metered via a syphon-like spiral tube system under the same temperature action as the melts to a mixing device into which the two spiral tube systems discharge whereby polymerization takes place.

Figure 1:
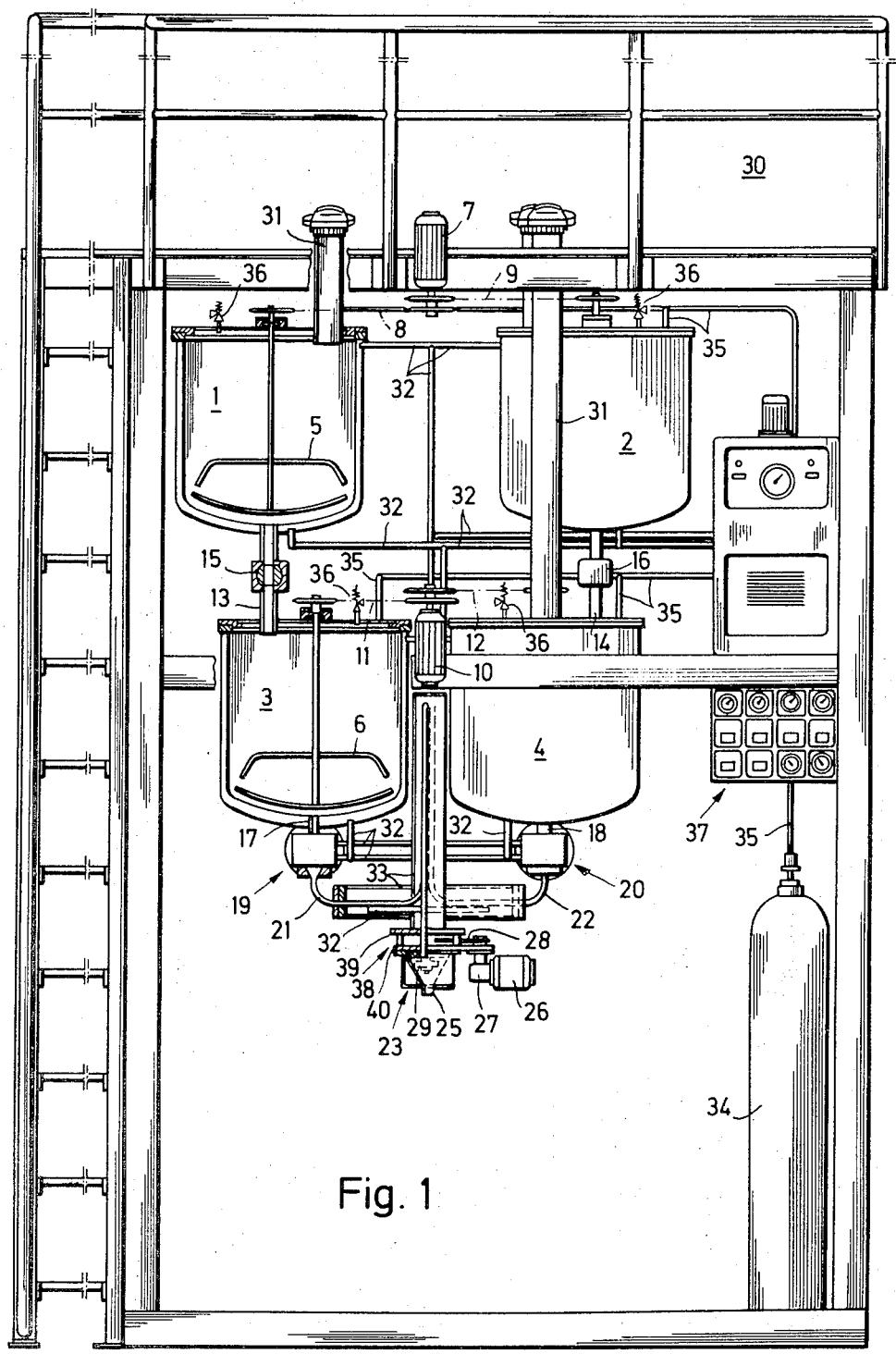

Also disclosed is apparatus for use in the described process characterized by two first containers for preparing the two lactam melt partial quantitives to which is connected in each case a second container for a catalyst or an activator which via synchronously operating liquid pumps are each connected with a syphon-like spiral tube system leading to a mixing device, whereby all containers are sealed in an air-tight manner and pumps and spiral tube system are heatable and wherein a nitrogen feed and drain system and a stirrer are provided.

---

The invention relates to a process and apparatus for the continuous performance of an anionic polymerization of lactams, such as in particular laurin-lactam, using catalysts such as lactam-alkali metal or alkaline earth metal compounds and activators such as acylated lactams or acylatable compounds which can be mixed with the molten lactam in the presence of nitrogen.

The anionic polymerization of lactams for the production of polyamide molded articles hitherto has almost exclusively involved the processing of caprolactam, whereby preponderantly if not exclusively, molds were used. Thus for example polymerization was initiated in the anhydrous molten lactam containing a small amount of the reaction product of lactam and an alkaline-reacting compound of alkali or alkaline earth metals by an acid derivative and then carried out in a mold corresponding to the desired molded article at temperatures between the melting point of the lactam and that of the polyamide. Molded articles produced by this process have an extremely high resistance to mechanical stressing and a uniform fine-crystalline structure, whereby it is possible to give the molded articles greater toughness and a higher impact strength, if by modifying this process the polymerization is started at temperatures above the melting point of the monomeric lactam and subsequently the reaction temperature is allowed to briefly rise to a maximum of about 40° C. above the softening point of the polyamide.

The production of polyamide molded articles from caprolactam, which according to the literature has a melting point of 70° C. and a heat of reaction of about 32 kcal./kg. and for which polymerization temperatures between 120 and 170° C. are recommended, requires a careful conditioning and in particular a carefully controlled cooling in order to prevent cracking of the very hard and brittle molded articles due to internal stresses. As a result of the hygroscopic behaviour of caprolactam very narrow limits are set on the use of such production processes.

In comparison with caprolactam, for laurin-lactam, which according to the literature has a melting point of about 150° C. of heat of reaction of about 7 kcal./kg. and a polymerization temperature between 160 and 200° C., it should be noted that from it as a result of polymerization a very tough material can be obtained, having no hygroscopic properties and which for its production requires no conditioning. Hence for a long period a continuously performable anionic polymerization process for laurin-lactam has been sought, so as to be able to industrially utilize the advantageous properties of this raw material.

The continuous performance of an anionic polymerization of laurin-lactam can be performed in accordance with the teaching of the present invention in that simultaneously a first partial quantity of molten lactam is actively mixed with a catalyst and a second partial quantity of molten lactam is actively mixed with an activator, in each case with the exclusion of oxygen and with continuous nitrogen action on the melt and both partial quantities, are then separated and similarly metered via a spiral tube system under the same temperature action as the melts to a mixing device into which the two spiral tube systems discharge. A liquid polymerized melt is obtained which can easily be molded into molded articles having all the advantageous properties of laurin-lactam. Optimum values can thereby in particular be obtained if the two partial quantities actively mixed with the catalyst or with the activator are homogenized before their introduction into the spiral tube system, and if according to a further partial feature of the present invention these two partial quantities, shortly before being combined in the mixing device, are passed through a much lower temperature zone compared with the temperature action of the melts, which can be considered as a shock zone. It is further considered to be advantageous to reduce the flow rate of the partial quantities actively mixed with the catalyst or the activator through the particular spiral tube system before the combining takes place in the mixing device. These measures mainly serve to obtain a uniformly polymerized melt which is free from any occlusions.

The proposed process according to the invention for the continuous performance of an anionic polymerization of laurin-lactam can be performed with simple apparatus. For this purpose the invention proposes an apparatus which essentially comprises two first containers for the preparation of the two lactam melt partial quantities to which in each case is connected a second container for a catalyst or an activator, each of which being connected via synchronously operating liquid pumps with a syphon-like spiral tube system leading to a mixing device, whereby all the containers are sealed in an air-tight manner and like the pumps and spiral tube systems are heatable, and have in each case a nitrogen feed and drain system and a stirrer. Each of the containers is preferably provided with an excess pressure valve in order to prevent the continuously supplied and removed nitrogen quantity being incorporated into the melt of the particular container. A common heating system can be supplied for all containers, pumps and spiral tube systems. In this connection it is considered particularly advantageous for the two spiral tube systems to be placed in a common casing through which flows an oil circulation system which also heats the containers and pumps. The ends of the spiral tube systems in the area before their discharge into the mixing device, regarding which the invention is based on known proposals, and outside their common casing are exposed to a cooling air flow in order to provide the above-indicated shock zone.

Figure 2:
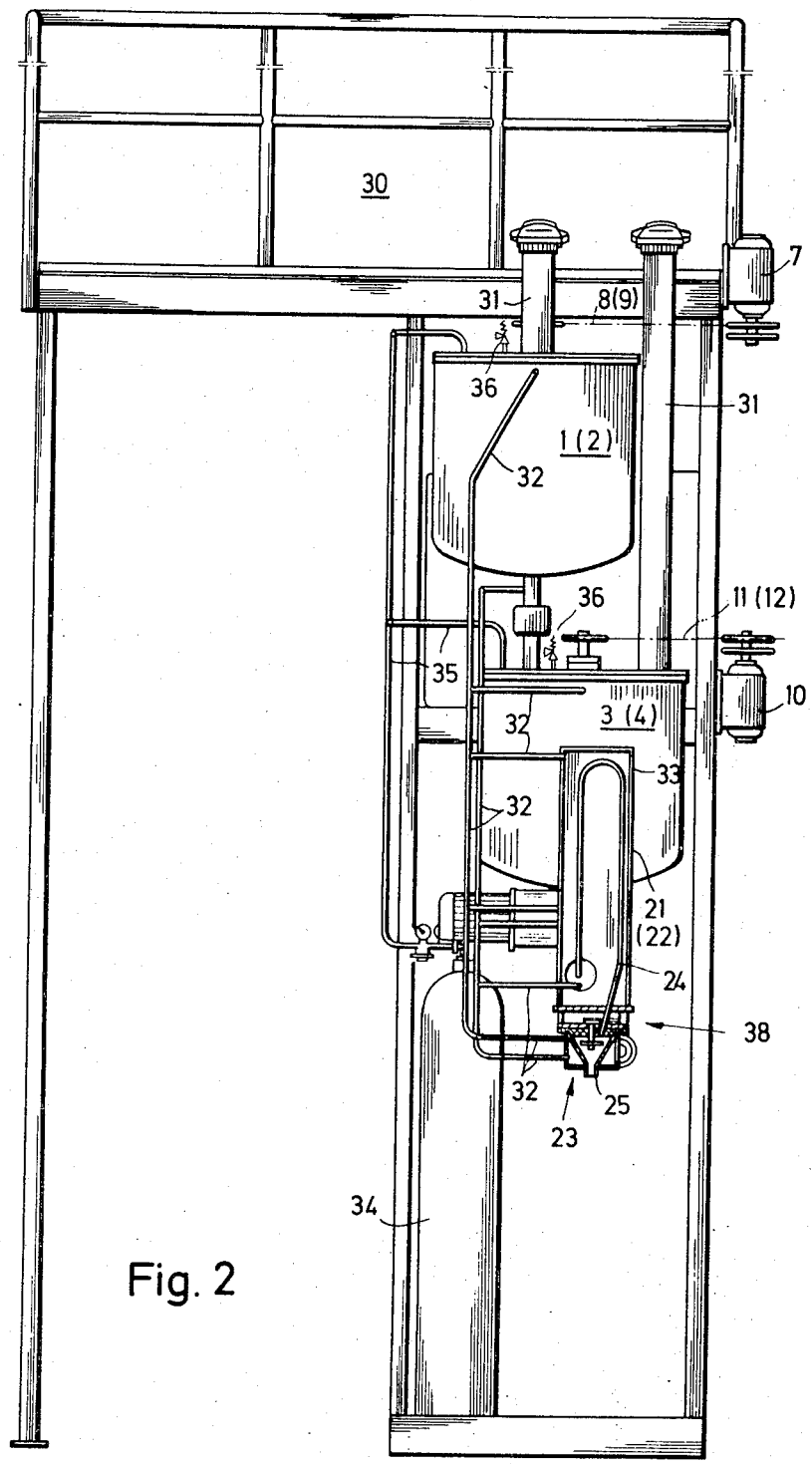

The apparatus proposed according to the invention for the continuous performance of an anionic polymerization of laurin-lactam is subsequently explained with the aid of an exemplified embodiment shown in the drawing, said drawing showing the apparatus in a partially cut out front view in FIG. 1 and in a side view in FIG. 2.

The installation comprises four containers 1, 2, 3 and 4, wherein in each case a stirrer 5 or 6 is located. The stirrers 5 of the upper first containers 1 and 2 which serve for the preparation of a lactam melt are driven, preferably synchronously, by means of a motor 7, for example via chain drives 8 and 9. The stirrers 6 of the lower two containers 3 and 4, whereof for example container 3 receives a catalyst and container 4 an activator are similarly driven by a motor 10 via chain drives 11 and 12. The containers 1 and 2 or 3 and 4 associated with one another are in each case interconnected via a connecting pipe 13 or 14, wherein is located in each case a stopping member 15 or 16 for blocking the flow.

A liquid pump 19 or 20 is connected to the delivery pipe 17 of container 3 and to the delivery pipe 18 of container 4. These liquid pumps 19 and 20 must operate completely synchronously so that in the same period they supply from containers 3 and 4 identical quantities to the connected syphon-like spiral tube system 21 or 22. The two liquid pumps 19 and 20 ensure a homogenization of the lactam melt partial quantity which, coming from containers 1 and 2 is actively mixed in containers 3 and 4 with the catalyst or the activator by means of the stirrer 6 located therein. The spiral tube systems 21 and 22 which are connected to the liquid pumps and discharge into a mixing device 23 ensure that this homogenized state of the lactam melt partial quantities actively mixed with the catalyst or the activator is maintained until they are combined in the mixing device 23, whereby a bend 24 provided in the spiral tube system, in each case in front of the outflow end thereof, serves to reduce the flow rate of the partial quantities. The mixing device 23 comprises a funnel terminating in an outflow pipe 25, wherein rotates a propeller 29 driven by a motor 26, reduction gear 27 and belt drive 28.

Each of the containers 1 to 4, all of which can be supplied from a loading platform 30 via feed pipes 31 is constructed in an air-tight manner. In addition all containers are heatable via a common oil circuit, whereof the individual pipelines are indicated as 32. These pipelines 32 supply not only the double casing of the individual containers but also the two liquid pumps 19 and 20 and a casing 33, wherein the two spiral tube systems 21 and 22 are arranged, so that it is thereby ensured that all the structural members of the installation functioning with the lactam melts are under the same temperature action which reaches values of 150 to 180° C. Furthermore the individual containers 1 to 4 are also in each case connected to a nitrogen supply system, the nitrogen flowing to them from nitrogen bottles 34 via a pipe line system 35 whereby the actual flow is controlled so that the nitrogen in the individual containers cannot mix with the melt. All containers are provided with an excess pressure valve 36 which prevents a too high pressure value building up in the containers which could bring about a penetration of the inflowing nitrogen into the melt.

A control system indicated in its totality by the reference numeral 37, controls in particular the uniform temperature action on the individual structural members of the apparatus as well as the synchronous operation of the two liquid pumps used in the apparatus. Firstly in the two first containers 1 and 2 the lactam melts are prepared which are then fed through the opening of blocking members 15 and 16 of the two second containers 3 and 4 in order to be mixed therein actively with the catalyst or the activator. The lactam melts are then continuously fed through the synchronously operating liquid pumps 19 and 20, which ensure the homogenization thereof, into the particular spiral tube system 21 or 22, wherein their flow rate is reduced shortly before the discharge point by the bend 24. Before the two lactam melt partial quantities actively mixed with the catalyst or activator are combined in mixing device 23, these are passed through a so-called shock zone 38 in their particular spiral tube system i.e. a zone wherein the lactam melts are subjected to a much lower temperature than before by the ends of the two spiral tube systems 21 and 22 in the area of their discharge into the mixing device 23 and outside the common casing 33 thereof being exposed to a cooling air flow between two spacedly arranged plates 39 and 40. Plate 39 simultaneously serves for the lower seal of casing 33, whilst plate 40 serves to fix mixing device 23, including the drive for its propeller. The lactam melts, continuously flowing from the spiral tube systems 21 and 22 into the mixing device 23 are therefore combined in this mixing device and then flow away via discharge tube 25 as a polymer for moulding into polyamide moulded articles.

Naturally structural details of the above-described apparatus can be modified as long as this does not affect the basic process measure that lactam melt partial quantities actively mixed with a catalyst or an activator prior to their combining in a mixing device provided for this purpose are in each case passed through a syphon-like spiral tube system, whereby the spiral tube systems must be subjected to the same temperature action as the containers, whereby the melts are prepared or are separately mixed with the catalyst and the activator.

I claim:

1. In a process for the continuous performance of an anionic polymerization of laurin-lactam to a moldable polymer by using catalysts of lactam alkali or alkaline earth metal compounds and activators of acylated lactams or acylatable compounds which are mixed with the molten lactam in the presence of nitrogen, the improvement wherein simultaneously a first partial quantity of the molten lactam is actively mixed with a catalyst and a second partial quantity of the molten lactam is actively mixed with an activator in each case with exclusion of oxygen and with continuous nitrogen action on the two melts, and both partial quantities are then separately and similarly metered, through a spiral tube system under the same temperature conditions as the melts to a mixing device into which the two spiral tube systems discharge.

2. The process according to claim 1, in which the two partial quantities actively mixed with the catalyst or the activator are homogenized before being introduced into the spiral tube system.

3. The process according to claim 1 in which the two partial quantities actively mixed with the catalyst or the activator shortly prior to their combining in the mixing device are passed through a temperature zone which is at a considerably lower temperature than the melts.

4. The process according to claim 1, in which the flow rate of the partial quantities actively mixed with the catalyst or the activator through the spiral tube system is reduced in said system, prior to the combining which takes place in the mixing device.

References Cited

UNITED STATES PATENTS

| | | | |
|---|---|---|---|
| 3,200,095 | 8/1965 | Wichterle et al. | 260—78 L |
| 3,494,999 | 2/1970 | Heckrotte | 260—78 L |
| 3,644,296 | 2/1972 | Bosch | 260—78 L |

WILLIAM H. SHORT, Primary Examiner

L. M. PHYNES, Assistant Examiner